(12) United States Patent
Arcaini et al.

(10) Patent No.: US 10,151,768 B2
(45) Date of Patent: Dec. 11, 2018

(54) METHOD AND APPARATUS FOR THE ACCURATE LINEAR SPEED MEASUREMENT OF TRAINS

(71) Applicants: Gianni Arcaini, Jacksonville, FL (US); William Scott Carns, Jacksonville, FL (US); Charles Hoeppner, Jacksonville, FL (US); Israel Umbehant, Jacksonville, FL (US)

(72) Inventors: Gianni Arcaini, Jacksonville, FL (US); William Scott Carns, Jacksonville, FL (US); Charles Hoeppner, Jacksonville, FL (US); Israel Umbehant, Jacksonville, FL (US)

( * ) Notice: Subject to any disclaimer, the term of this patent is extended or adjusted under 35 U.S.C. 154(b) by 511 days.

(21) Appl. No.: 14/994,264

(22) Filed: Jan. 13, 2016

(65) Prior Publication Data
US 2017/0199215 A1    Jul. 13, 2017

(51) Int. Cl.
| | | |
|---|---|---|
| *G01P 3/50* | (2006.01) | |
| *G01D 5/20* | (2006.01) | |
| *B61L 25/02* | (2006.01) | |
| *B61L 1/20* | (2006.01) | |
| *B61L 27/00* | (2006.01) | |
| *G01P 3/66* | (2006.01) | |

(52) U.S. Cl.
CPC ............... *G01P 3/50* (2013.01); *B61L 1/20* (2013.01); *B61L 25/021* (2013.01); *B61L 27/0077* (2013.01); *B61L 27/0094* (2013.01); *G01D 5/2006* (2013.01); *G01P 3/66* (2013.01)

(58) Field of Classification Search
CPC ........ G01D 5/2006; B61L 25/021; G01P 3/50
USPC ...... 324/207.15, 200, 76.11, 750.12, 754.22, 324/500, 600, 244, 605, 207.2; 376/102, 376/108, 120, 152
See application file for complete search history.

(56) References Cited

U.S. PATENT DOCUMENTS

| | | | |
|---|---|---|---|
| 3,721,821 A | 3/1973 | Blanyer | |
| 6,856,344 B2 | 2/2005 | Franz | |
| 7,481,400 B2 | 1/2009 | Appleby | |
| 8,892,368 B2 | 11/2014 | Saracho Rotaeche | |
| 2011/0313671 A1* | 12/2011 | Nedilko | B61K 9/08 |
| | | | 702/14 |
| 2016/0046308 A1* | 2/2016 | Chung | B61L 25/025 |
| | | | 701/20 |

* cited by examiner

*Primary Examiner* — Melissa Koval
*Assistant Examiner* — Trung Nguyen
(74) *Attorney, Agent, or Firm* — Lawrence J. Gibney; Mitchell Ghaneie

(57) ABSTRACT

The calculation of the speed of a moving train is critical to being able to capture high speed resolution images of the undercarriage of a moving train using a camera in an associated application. The measurement must be extremely accurate and in real time so that an appropriately placed camera can capture images and transmit those images to a remote location.

8 Claims, 6 Drawing Sheets

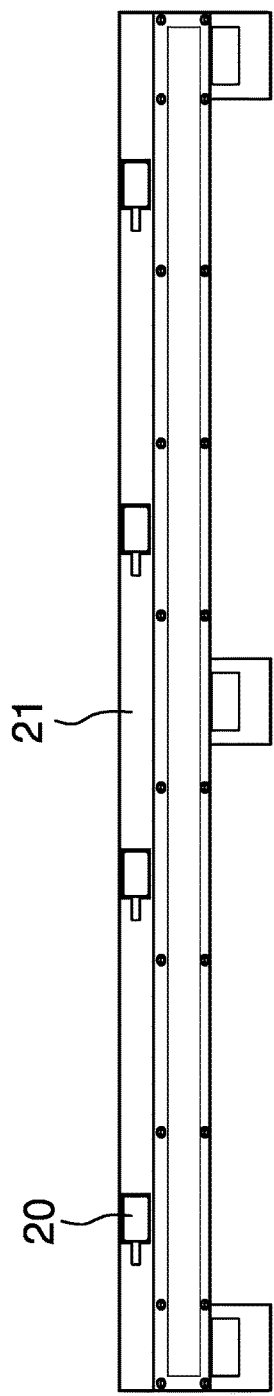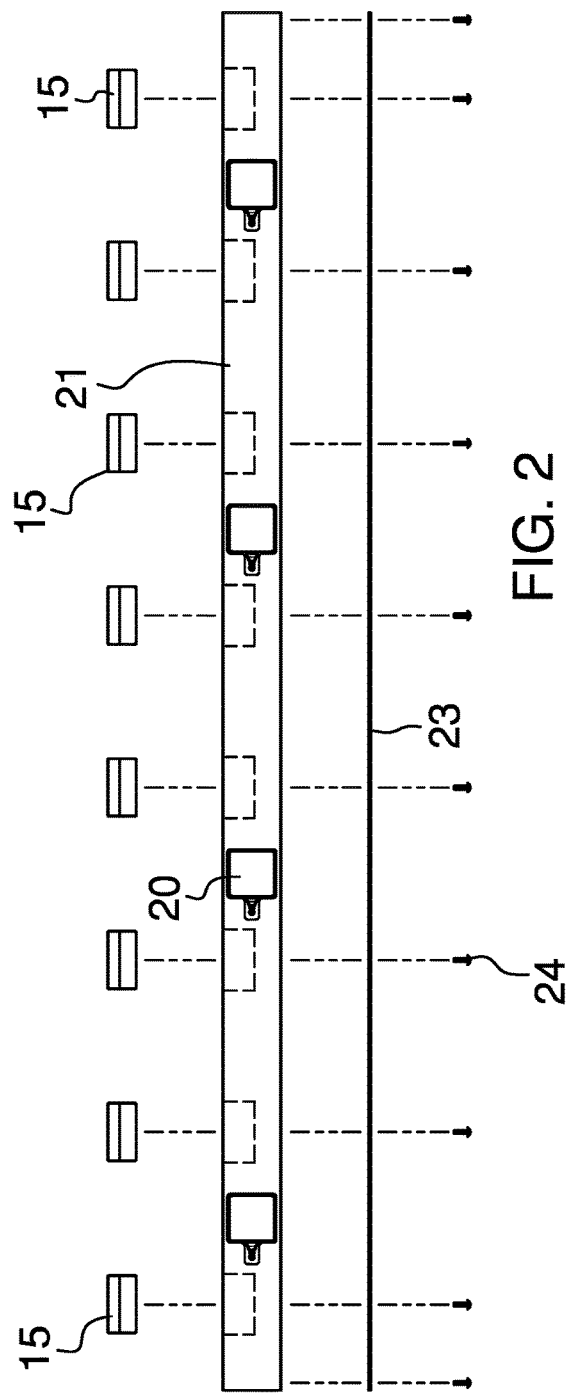

METHOD AND APPARATUS FOR THE ACCURATE LINEAR SPEED MEASUREMENT OF TRAINS

CROSS REFERENCES TO RELATED APPLICATIONS

This application is related to the application, Apparatus and Method to Capture Continuous High Resolution Images of Moving Train Car Undercarriages and Its Structural Components with Ser. No. 14/971,145 with a filing date of Dec. 16, 2015 and has been filed by the same inventors.

BACKGROUND OF THE INVENTION

A. Field of the Invention

The present invention relates to accurately gauging the speed of a train going through various positions on the tracks. This will be used in conjunction with the method and apparatus for taking high-speed resolution images of the undercarriage of a train.

A plurality of speed detection devices will be placed on the railroad tracks for a predetermined length that will allow the user of this device to calculate the speed of a train within a fraction of a mile per hour.

As a train passes over each one of the markers or indicators a measurement is taken and corresponding speed of the train is calculated using an algorithm for that purpose.

When the speed of the train is calculated, software is incorporated to interact with a device to take high-speed resolution images of the undercarriage of a train. This is accomplished by adjusting the frame rate of the camera that is involved as well as adjusting the illumination means.

B. Prior Art

There are many prior devices that are utilized to provide the speed of trains. However, few can calculate the linear speed of a train with the necessary precision and accuracy of the present invention.

The U.S. Pat. No. 8,892,368, by Saracho Rotaeche et al. (Saracho), discloses a method for attaching sensors to railway tracks. The sensors in this device measure stresses in track railways. This is done by analyzing the movement of vibrations through the rail car. The sensors are also capable of measuring speed by recording the times of different signal peaks recorded by the system. The present invention on the other hand utilizes the actual wheels of a rail car for determining the speed of the train.

While U.S. Pat. No. 7,481,400, by Appleby et al. (Appleby), and U.S. Pat. No. 3,721,821, by Blanyer, also disclose devices that utilize railway wheel sensors to determine train speed, the present invention discloses differences that are unique and non-obvious from the prior art. Appleby measures vibrations to determine when the wheel of the train is present and Blanyer uses magnetic fields to complete a circuit as the train wheel passes through them.

The present invention is novel and significantly different from the prior art in that it incorporates a plurality of devices containing within each a plurality of sensors that work in tandem to determine very precise and accurate measurements of the speed of a train at a given point in time.

BRIEF SUMMARY OF THE INVENTION

This is a method and apparatus for accurately and precisely measuring the linear speed of a train and communicating the speed to a separate device for taking high speed and high resolution images of the moving train. The related application utilizes the information that is collected with this application.

This invention operates by utilizing a plurality of bars with each containing a series of sensors that are evenly spaced along the bar. Each sensor detects the presence of the train wheel and through this plurality of sensors calculates the speed of the train.

The speed of the train is then communicated with a computer control module every time the train's wheel passes over each sensor.

Each of the sensors is angled so that the wheel of the train will come within 25 millimeters of the sensor.

Although it is anticipated that there are many bars that may be used and many sensors that may be placed on each device, the preferred embodiment is to have a series of five sensors on each bar and four bars placed along the rail of a track for a total of twenty sensors on each side of the tracks. This will provide the computer control module with enough values to calculate the speed of the train and allow a camera under the train carriage to take detailed synchronized photos of the moving train. If an inaccurate speed of the train is calculated, it will affect the speed of the camera and consequently, produce less than desirable images of the undercarriage of the train.

It is anticipated that the speed of the train can be calculated within a fraction of a mile per hour. This is necessary to insure that the frame speed of the camera in the related application works appropriately and produces the best quality image.

Each bar will attach to the rail of a train track with powerful rare earth magnets. This helps to insure that if the device is hit by debris from the train it will break off the track without causing significant damage to the rail. It is also anticipated that each device could communicate wirelessly to the computer control module that determines the speed of the train.

More bars can be added to increase resolution and accuracy depending upon the length and speed of the object being measured and depending on the needs of a particular customer.

BRIEF DESCRIPTION OF THE DRAWINGS

FIG. 1 is a front view of the device.
FIG. 2 is a top view of the device.

NUMBERING REFERENCE

5—Railroad Track
10—Railroad Ties
15—Magnets
20—Sensor
21—Speed Sensor Casing
22—Speed Sensor Stabilizer
23—Cover
24—Screws to Attach Cover
25—Camera
30—Speed Sensor Device
35—Controller

DETAILED DESCRIPTION OF THE EMBODIMENTS

The calculation of the speed of a moving train is important in conjunction with an application to capture images of the underside of a moving train in real time and the ability to transmit clear images to a remote location. The ability to capture these images will increase the efficiency of the inspection of the underside of a train. Without this ability the train would be forced to stop and be manually inspected.

Figure 4:
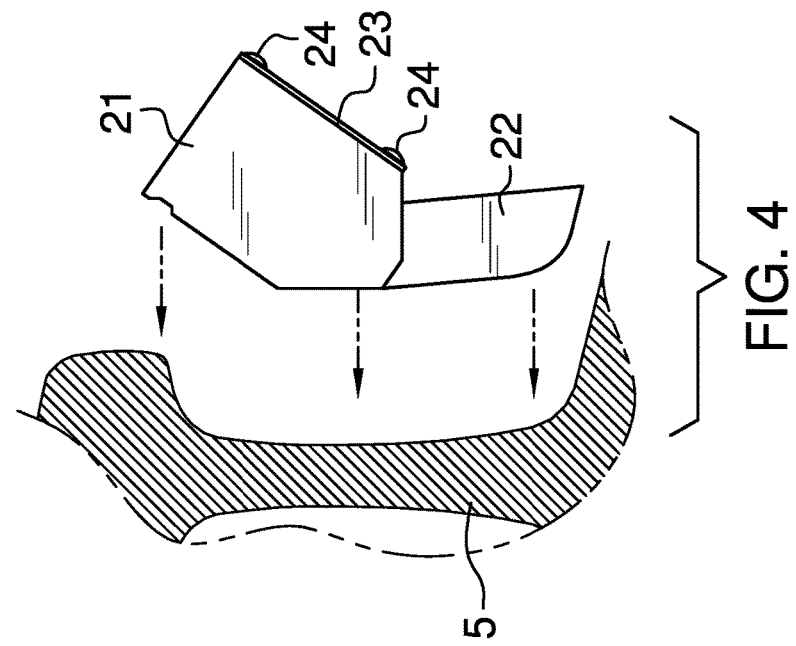
FIG. 4 is a detailed view of the sensor attached to the rail.
Figure 3:
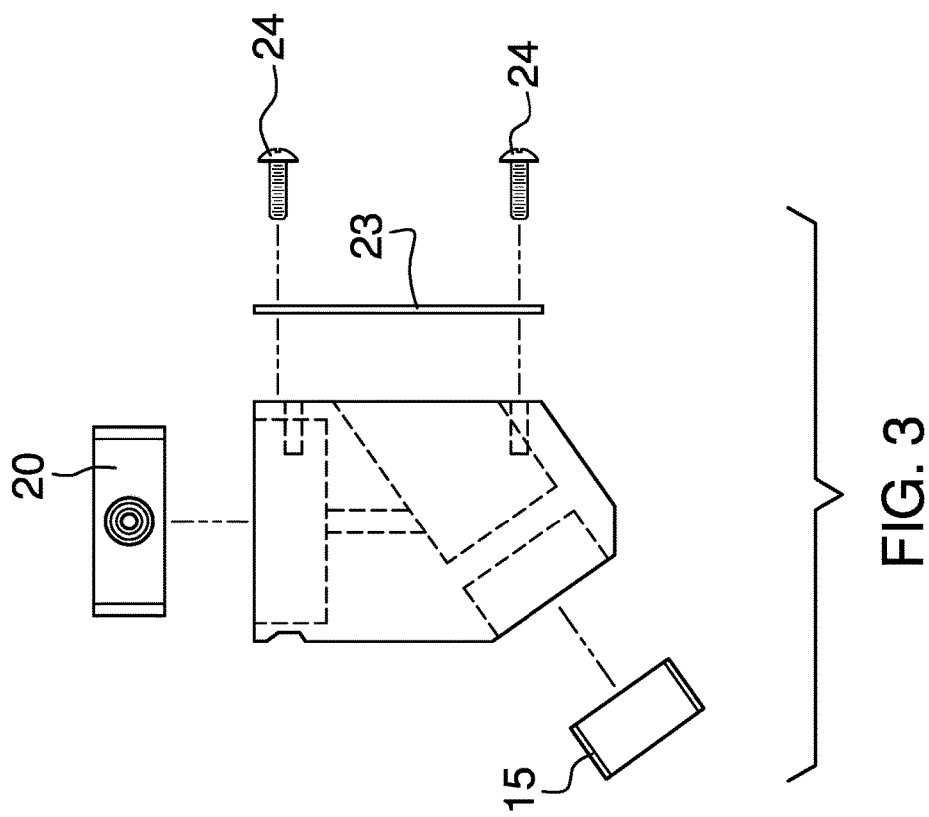
FIG. 3 is an exploded view of the sensor component.
Figure 5:
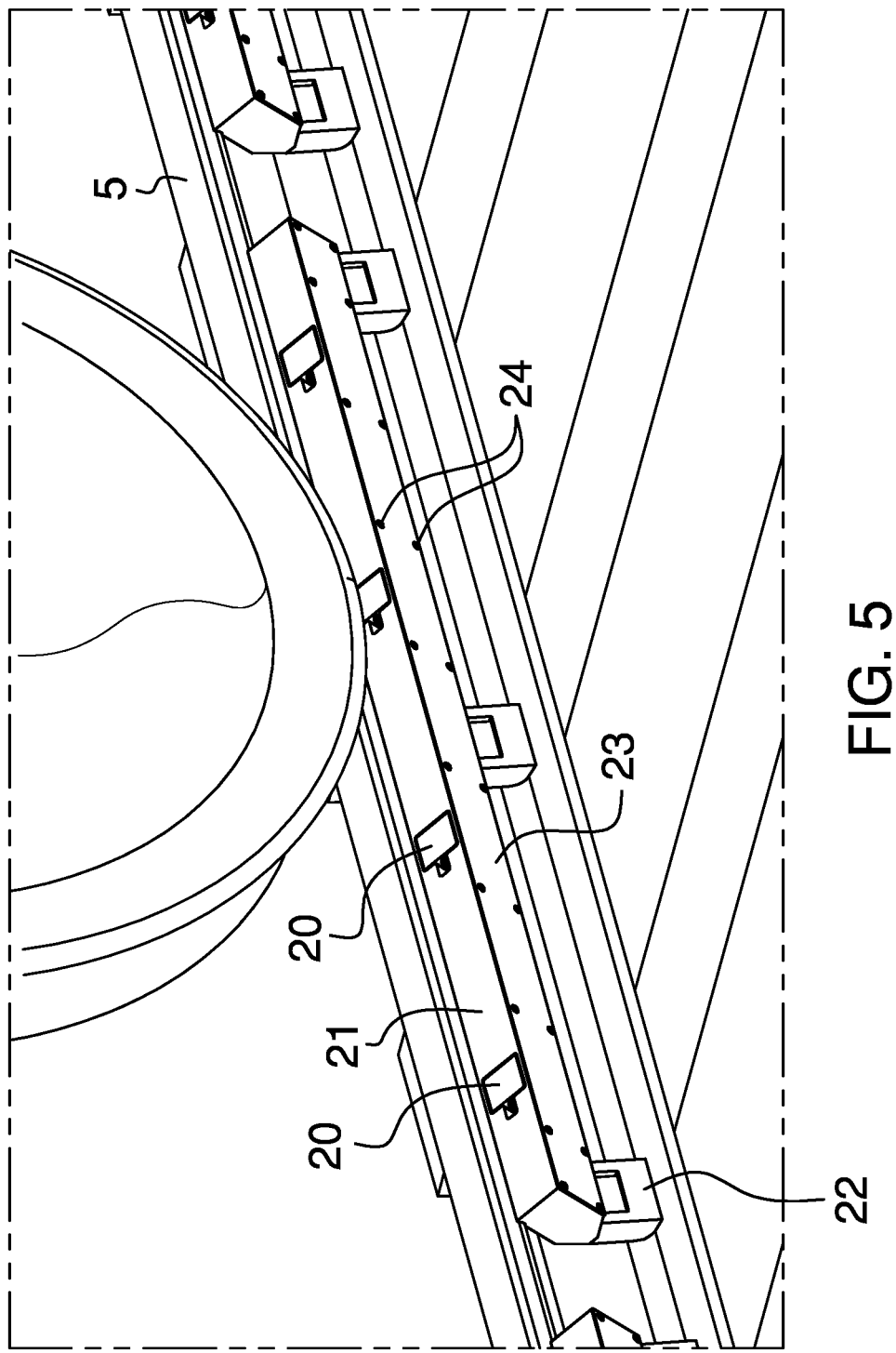
FIG. 5 is an in-use view of the system.

A plurality of inductive sensors 20 are placed at a predetermined location on a railroad track 5. The sensors are placed a foot apart and are encased in a protective casing 21 and a cover 23 with a means to open 24 the sensor such as a screw. The plurality of sensors are attached to a bar that is used for that purpose. Additionally the shape of the sensor should also be designed so that the sensor is attached to the track in order to most closely conform to the shape of the track such as depicted in FIG. 4; for that purpose a speed sensor stabilizer 22 that conforms roughly to the surface of the railroad track is used.

The plurality of sensors are attached to the railroad tracks 5 using a plurality of magnets 15. The sensor is positioned so that when the railroad wheel passes over the inductive sensor, the sensor 20 will detect the presence of the wheel and measurements from the plurality of sensors will enable the calculation of the speed of the train within a fraction of a mile per hour. The exactness of the speed of the moving train is critical because this speed calculation controls the speed of the camera in the related application. It is imperative that the speed be accurately calculated so that the speed of the camera can be appropriately controlled and quality images can be produced.

The placement of the individual sensor in relation to the train wheel should be no more than 25 millimeters from the surface of the train wheel in order to insure that the sensor detects the presence of the train wheel.

A plurality of sensors 20 are placed on a bar 23 along the track 5 and as each wheel passes over the sensor 20 the data from the sensors will then be transmitted to a controller 35 so that an accurate measurement of the speed of the train can be calculated. A plurality of sensors 20, which are equally spaced on the bar 23 to insure the uniform spacing of the sensors, is used in order to be able to calculate the speed within a fraction of a mile per hour. The speed of the train which is calculated using associated software and a controller 35 to transmit the information to the camera 25 in the associated application dictates the frame speed of the camera 25 that is incorporated into the apparatus and method to capture high speed resolution images from a moving train that is referenced in application Ser. No. 14/971,145.

Although a plurality of sensors are used and placed on the bar, an individual sensor can be replaced or serviced if needed. It is anticipated that there will be four or five sensors on the bar and each sensor will be placed roughly one foot apart in order to calculate the exact speed of the train and therefore produce the best quality images.

It is anticipated that a plurality of sensors will be attached to a bar, which will be attached to the rail ties using rare earth magnets 15. Rare earth magnets have special abilities to withstand extremes in all types of environments without damage. Although rare earth magnets are anticipated with this application other types of devices may be used to secure the bar or bars to the railroad tracks.

Figure 6:
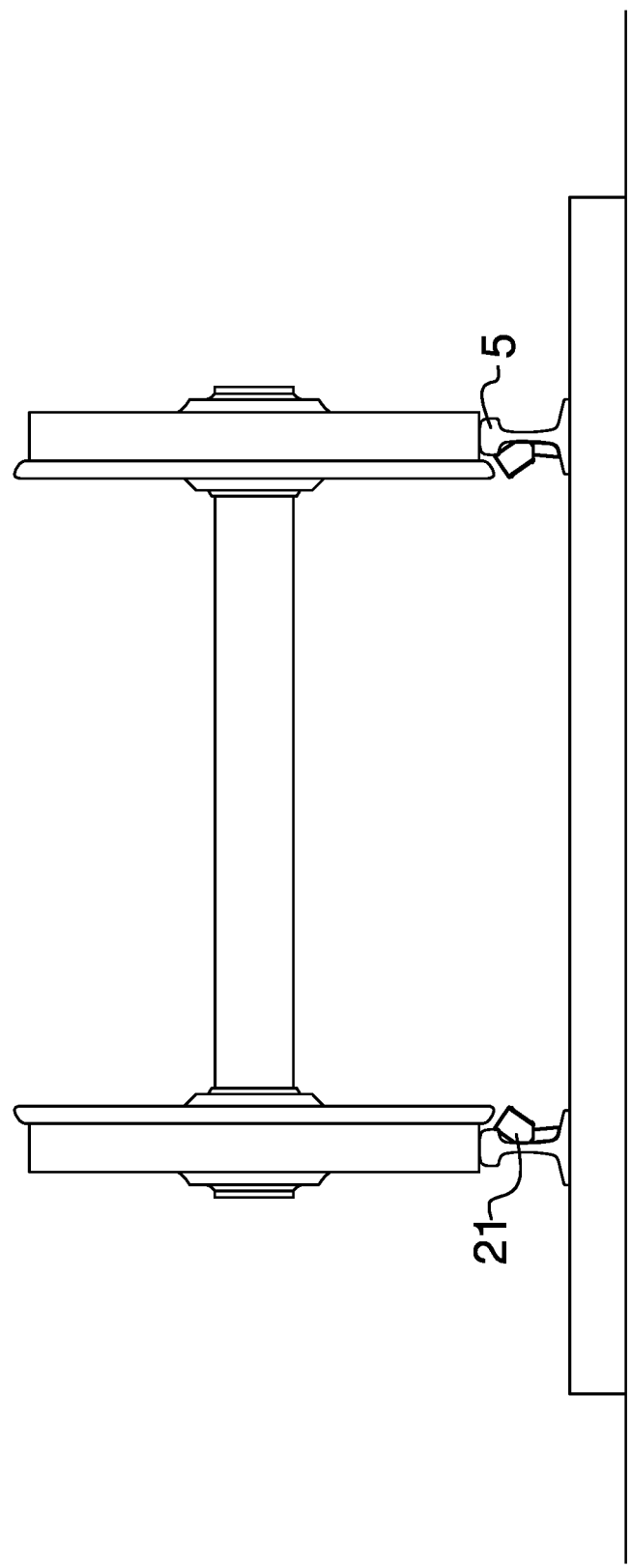
FIG. 6 is a front view of the system attached to the rail and a depiction of the train wheel.
Figure 7:
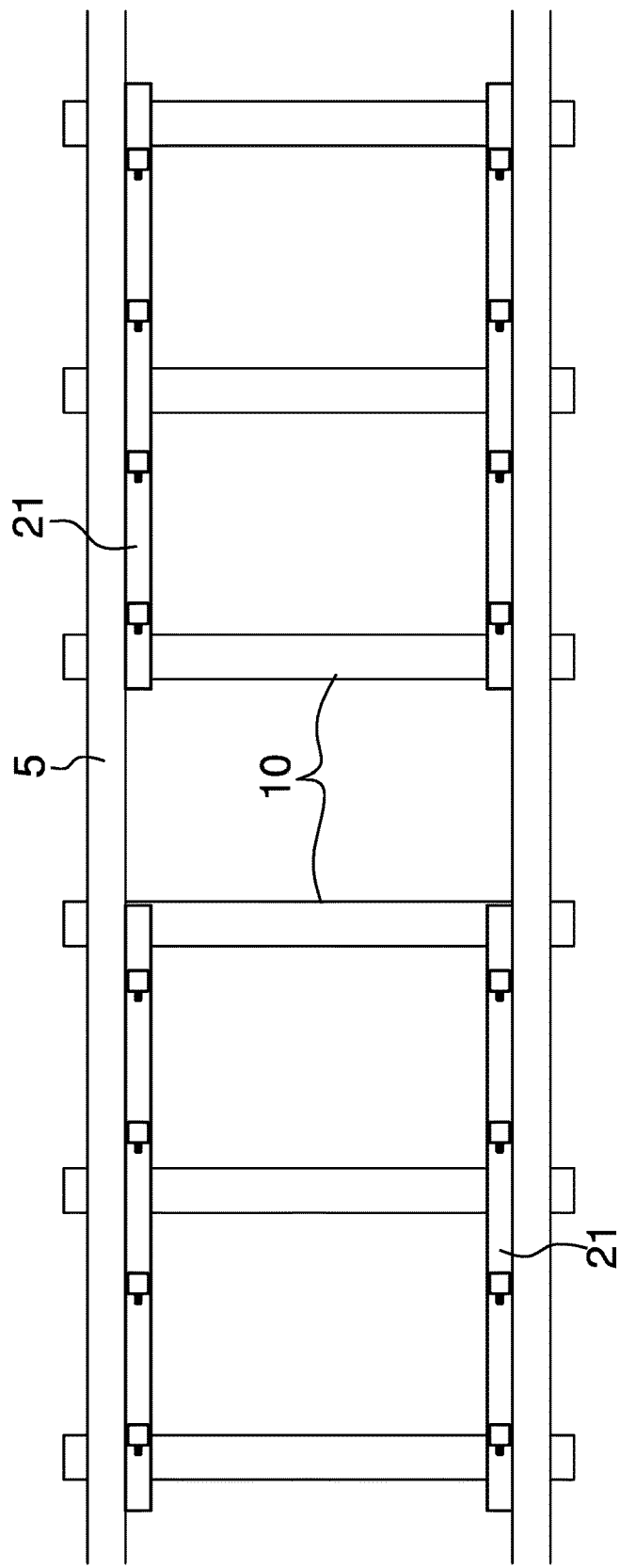
FIG. 7 is a top view of the system installed on the tracks.
Figure 8:
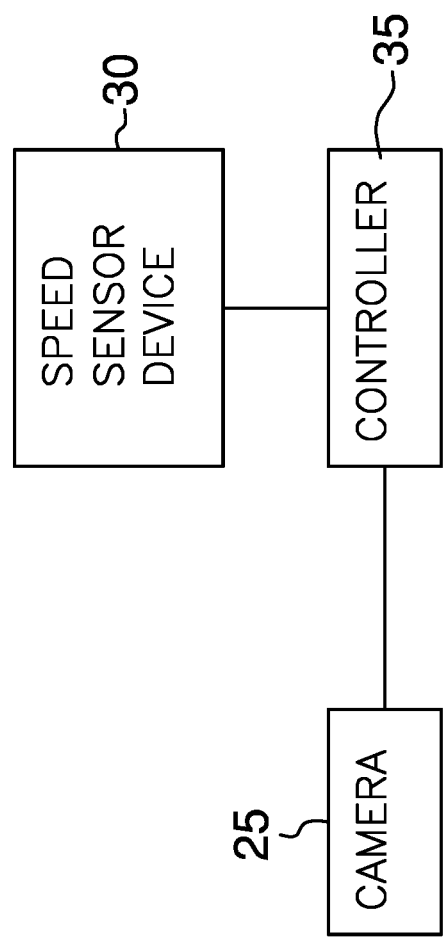
FIG. 8 is a schematic of the system.

Regardless of the method of attachment or the magnet type that is used, the means of attachment should be durable and be able to withstand extremes in pressures, temperatures and all outdoor environmental conditions. As depicted in FIG. 6 the sensor is placed on the inside surface of the railroad track to insure that the sensor detects the flanged metal surface of the train wheel, which is placed on the interior surface of the train wheel. Additionally, the sensor is likely to be more protected if it is placed on the interior surface. Although it is depicted on the interior of the surface of the wheel, it may also be placed on the exterior of the track surface as long as it is positioned to detect the presence of the train wheel surface. The plurality of sensors within the bars may also be mounted directly into the ground although the critical placement feature is to insure that the sensors detect the presence of the train wheel.

The means to secure the bar with the sensors is not critical other than the fact that the sensor needs to be in a position that will allow the detection of the train wheels as it passes over the sensor.

While the embodiments of the invention have been disclosed, certain modifications may be made by those skilled in the art to modify the invention without departing from the spirit of the invention.

The inventors claim:

1. A device to measure the linear speed of a train, which is comprised of:
   a. a plurality of sensors;
      wherein the plurality of the sensors will calculate the speed of a train;
      wherein the plurality of sensors is secured to a bar;
      said bar is secured to a railroad track;
      wherein each individual sensor is encased in a protective casing;
   b. a plurality of rare earth magnets;
      wherein the plurality of rare earth magnets is positioned along the exterior of the bar;
      wherein the plurality of rare earth magnets secures the bar to a rail of a rail road track;
   c. a controller;
      wherein the controller is located within the speed sensor casing;
      wherein the controller transmits the information provided by the plurality of sensors to software;
      wherein the software uses the information provided by the plurality of sensors to calculate the linear speed of the train;
   d. a plurality of speed sensor stabilizers;
      wherein the plurality of speed sensor stabilizers is affixed to the bar.

2. The device as described in claim 1 wherein the placement of the plurality of sensors is placed on the interior of the railroad track.

3. The device as described in claim 1 wherein the placement of the plurality of sensors is placed on the exterior of the railroad track.

4. The device as described in claim 1 wherein the speed of the train is calculated within a fraction of a mile per hour.

5. The device as described in claim 1 wherein each sensor of the plurality of sensors is an inductive sensor.

6. The device as described in claim 1 wherein a plurality of bars is affixed to both rails of the railroad track.

7. The device as described in claim 1 wherein a predetermined distance is provided between each sensor of the plurality of sensors.

8. The device as described in claim 1 wherein the plurality of sensors operates in series.

* * * * *